June 24, 1947. C. F. EATON 2,422,719
DISPENSING DEVICE WITH TIPPING TRAP CHAMBER
Filed June 29, 1944
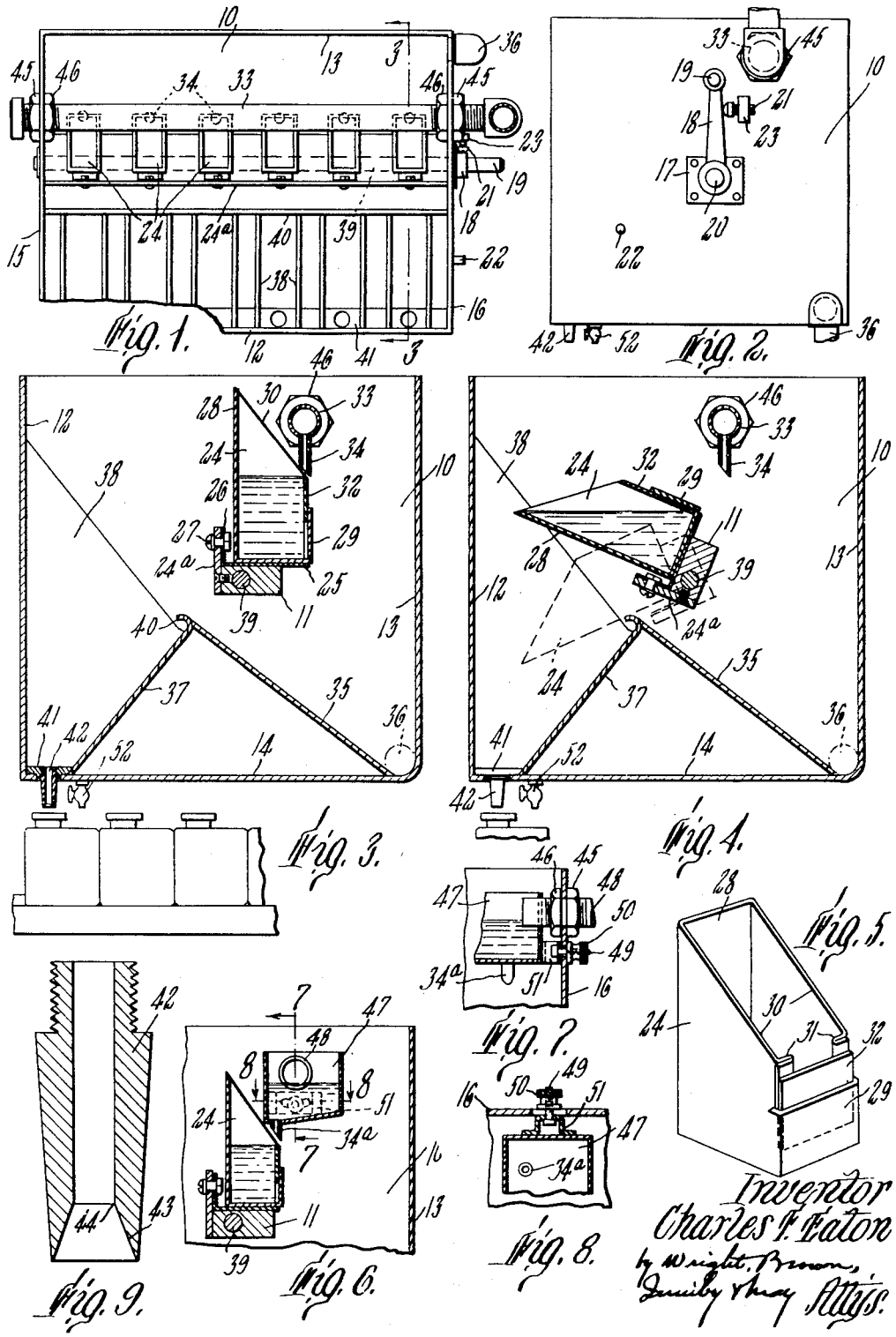
Inventor
Charles F. Eaton Patented June 24, 1947

2,422,719

UNITED STATES PATENT OFFICE 2,422,719

DISPENSING DEVICE WITH TIPPING TRAP CHAMBER

Charles F. Eaton, Methuen, Mass., assignor to Bennett Incorporated, Cambridge, Mass., a corporation of Massachusetts Application June 29, 1944, Serial No. 542,779

15 Claims. (Cl. 222—282)

This invention relates to apparatus for rapidly measuring out accurately prescribed quantities of liquid and delivering the same to cans, bottles or other receptacles. For the purpose of this description bottles and other receptacles are considered as equivalent to cans, and the word "cans" in the title is used in a generic sense. However, in the present employment of the apparatus receptacles of the type generally and popularly known as cans are the usual recipients of the measured quantities of liquid.

One of the objects of the invention is to accomplish both the measurement and delivery of specified quantities of liquid with the greatest possible accuracy and rapidity. These considerations of accuracy and rapidity are particularly important where the individual quantities of liquid are small, such as the contents of two ounce cans, where errors as small as a few drops accumulate to a large volume in the course of filling many thousands of cans.

Another object is to enable accurate adjustments to be made in accordance with different viscosities of liquids being dispensed, so that the quantities delivered to the cans may be accurate and uniform under all conditions.

A further object is to make possible a rapid and easy substitution of parts so that the same apparatus may be used to fill cans of many different sizes. For example, the apparatus here illustratively represented is adaptable for delivering measured quantities within a range of from two fluid ounces to one quart.

These and other related objects are fulfilled by the apparatus described in the following specification with reference to the drawings. The invention comprises, not only the specific means and structures thus shown, but also the principles embodied therein and all equivalent means and structures.

The present application is a continuation in part of my application Serial No. 482,235, filed April 8, 1943, and embodies the principles there disclosed together with improvements which better accomplish the purposes of the prior application and accomplish other objects also.

In the drawings,

Fig. 1 is a plan view of an illustrative measuring apparatus embodying the invention;

Fig. 2 is a side elevation of the same as seen from the right of Fig. 1;

Fig. 3 is a sectional view taken on line 3—3 of Fig. 1 and represented on a somewhat larger scale;

Fig. 4 is a sectional view similar to Fig. 3 but showing the measuring buckets in a different position;

Fig. 5 is a perspective view of one of the measuring buckets;

Fig. 6 is a sectional view of the upper part of the apparatus showing the adaptation of the apparatus for measuring smaller quantities of liquid than those for which the machine is set up in the preceding figures;

Figs. 7 and 8 are detail sectional views taken on lines 7—7 and 8—8, respectively, of Fig. 6;

Fig. 9 is a detail sectional view of the delivery spout.

Like reference characters designate the same parts wherever they occur in all the figures.

The body of the apparatus is a box or case 10 preferably of rectangular form having four side walls and a bottom and being open at the top. When in use, this box is mounted on any suitable table, bench or other supporting frame with its bottom horizontal. A shaft 11 extends across the interior of the box parallel to the front and rear walls 12 and 13 and the bottom 14, and has trunnions at its ends supported in the end walls 15 and 16 of the box. If, as is suitable practice, the walls of the box are made of light weight sheet metal, any suitable bearings, one of which is shown at 17 in Fig. 2, may be mounted in the end walls to provide adequate support for the rock shaft trunnions. Preferably shaft 11 is rectangular and so arranged as to provide a flat upper surface on which the bottoms of the measuring buckets, later described, may rest and be stably supported. A crank 18 having a handle 19 is mounted on one of the trunnions, as the trunnion 20, outside of the end wall 16, and is operable manually to turn the rock shaft through an angle limited by stops 21 and 22 on the adjacent end wall. Stop 21 is adjustable for a purpose later described, and is conveniently made as a screw threaded through a lug 23 secured to the end wall.

Measuring buckets 24 are supported on the rock shaft inside of the box or case. Preferably a considerable number of buckets, in this illustration six, are supported in a row side by side on the rock shaft with suitable spacing between them, in order that a single machine attended by one operator may fill a number of cans at the same time. The number of buckets which may thus be assembled in one apparatus is limited only by the strength and endurance of the operator, in the case of hand operated machines; while in the case of automatic machines the only limitations are those of space and bulk.

The buckets are detachably connected with the rock shaft and are interchangeable with others of different volumes. Various means may be employed for so connecting them. The means shown for illustration here comprises a strip of metal 24a secured to the front face of the rock shaft so that its upper edge extends above the top face, or bucket supporting surface of the shaft and forms a ledge. Each bucket has a metal strap 25 soldered or welded to its bottom, which projects beyond the front wall of the bucket and is turned up at its end to form a lug 26. Such lug is secured to the ledge portion of strip 24 by a bolt 27 and attached nut; these parts being so disposed that the bucket rests on the top face of the rock shaft when in upright position.

All of the buckets, of whatever size, are substantially alike, in that all are formed with a front wall 28 of substantially greater height than the rear wall 29 and with side walls of which the upper edges 30 adjoin the top edge of the front wall and slope thence on a steep downward inclination to points above the upper edge of the rear wall. Portions of the side walls above the rear wall are bent inward and outwardly folded to provide separated flanges 31 spaced slightly forward of the rear wall. A gate 32 is contained between the flanges 31 and the rear wall and is adapted to be placed so as to occlude a greater or less proportion of the height of the space between the flanges. The position of the gate determines the quantity of liquid which the bucket can hold when in the upright position, and any one bucket may be adapted to hold any quantity of liquid within a considerable range by suitably setting the gate. Thus, for instance, a bucket of relatively small capacity may be adjusted to hold quantities between two and four fluid ounces, a larger bucket quantities between four and eight fluid ounces, and so on. Preferably, and in order to prevent displacement of the gate from an adjusted position when in service, the gate is permanently secured, by soldering or otherwise, after it has been set where its upper edge is exactly flush with the surface of the measured quantity of liquid. Thereafter adjustments of the apparatus for delivering quantities other than that for which a bucket has thus been set are preferably made by substituting buckets of other set capacities. Preferably all the buckets employed at the same time are of the same capacity, although this is not an essential condition.

The buckets are shiftable by operation of the crank 18 between an upright position, substantially or approximately that shown in Fig. 3, to a dumping position, substantially as shown by broken lines in Fig. 4, being arrested in the dumping position by stop 22, which is located suitably for that purpose. Supply means are provided for delivering liquid to the buckets when in their upright position. One form of supply means is shown in Figs. 1–4, and consists of a pipe 33 mounted in the end walls of the case and extending across the interior thereof above the rear walls of the upright buckets. This pipe may be connected to receive liquid from an elevated tank or any other source suitably disposed or operated to apply a head adequate to discharge the liquid into the buckets with sufficient rapidity. Discharge nozzles 34 lead downward from the pipe and each terminates close to and directly above the gate 32 of one of the buckets. Functionally the gate constitutes a part of the rear wall of the bucket and is so considered for the purpose of this description and definition in the claims.

The relation of the nozzle 34 to the rear wall of the bucket is an important feature of the invention. The nozzle discharges directly downward and the issuing stream passes so close to the rear wall that the least movement of the bucket forwardly cuts it off. The rear wall and all other parts of the bucket are much thinner in proportion to other dimensions than as represented in these drawings, when made of sheet metal; or if made of other material having greater thickness, the upper margin of the rear wall may be beveled to a thin edge. This edge may even split the stream. Or the nozzle may be formed with a slit-like orifice and disposed to deliver a ribbon-like stream in a plane parallel to the rear wall and in proximity thereto substantially as previously described. When liquid has accumulated in the buckets to the tops of their respective rear walls, it spills over and falls upon an inclined inner floor 35 which extends from the bottom of the box near the rear wall 13 thereof on a steep upward slant to a termination below and somewhat in front of the rock shaft. The overflow, and such of the liquid as may pass on the outside of the buckets from the nozzles during filling, runs to the valley between the floor 35 and wall 13, and is carried off by an eduction pipe 36 which opens into the box at the bottom of this valley.

A floor plate 37 adjoins the forward edge of the floor plate 35 and extends on a downward slope to a junction with the bottom 14 of the box somewhat in rear of the front wall 12. The space between the floor plate 37 and front wall 12 is divided into a row of funnels by upright partitions 38, which are soldered at their bottom and forward edges to the walls 37 and 12, respectively. The partitions are arranged in pairs conformably to the buckets, those of each pair embracing a space somewhat wider than their related bucket and being disposed so that the upper end of the bucket may enter between them when tilted to its dumping position. The junction between the floor plates 35 and 37 is considerably to the rear of the position taken by the open end of the bucket when overturned, and the lower portions of the partition walls extend far enough to the rear to embrace substantially the entire bucket mouth when in that position. This is one of the factors provided to insure that the entire contents of each bucket, and the contents of only a single bucket, will pass into the appropriate funnel when the buckets are dumped.

Another of the factors for that purpose is the truncated formation of the buckets previously described, that is, the formation with a high front wall and side walls having the inclined edges 30 or the like. By virtue of this formation, spilling of the contents of the buckets while being tilted is prevented until after the extremity of the bucket has entered well within its funnel. From the beginning of tilting movement, the surface of the liquid ebbs from the edge of the rear wall and flows toward the lip of the front wall until, when the bucket has reached the position shown in Fig. 4, it reaches the lip. At that time the lip has passed well forward of the ridge between the plates 35 and 37 and has entered its appropriate funnel, and the side walls of the bucket rise well above the level of the liquid in those parts of the bucket which are directly above the ridge, or nearly so. With further movement beyond the full line position toward the broken line position of Fig. 4, the liquid is poured from the bucket into the funnel. It may be noted also that the rear wall of the bucket is so far to the rear of the pivot axis 39 of the rock shaft that its upper edge has a substantial vertical component of motion at the beginning of the tilting action. This, together with the formation of the front and side walls, prevents the liquid from slopping out, due to its inertia, when the dumping movement is commenced violently by sudden application of force to the crank handle.

The dumping movement is carried out very rapidly and the liquid gushes suddenly from the buckets. Some of it strikes the front wall 12 and splashes therefrom. To prevent loss of any liquid by splashing over the ridge of the plates 35 and 37, the latter plate is set on a steep inclination, of more than 45° with the horizontal, and is curled over at its rear edge toward the front, forming a lip 40 suitably situated to arrest and return any surging liquid.

An outlet spout is mounted in the bottom of each funnel. A reinforcing strip 41 is applied to the bottom 14 of the case in the angle between the front wall 12 and the floor plate 37 and is shaped to fill the intervening space. It may be secured with solder so applied as to fill all cracks and leave no pockets in which liquid dispersed could collect. Spouts or nipples 42 pass through alined holes in the bottom 14 and strip 41 (one at the bottom of each funnel space) and are screwed into the strip. This mode of attachment permits spouts with bores of different diameters to be used with cans of different capacities in order to avoid great disparity in the time required to fill such cans and prevent a too sudden gush of the liquid into cans of smaller capacities.

A novel feature of the invention is embodied in a formation of the nipple or spout which prevents dripping after a measured quantity of liquid has flowed out of it from the funnel. A film of liquid always remains adherent to the inner walls of a tube or channel after a quantity of the liquid has passed through, and usually there is a gradual migration of the liquid to the rim of the outlet orifice, with collection of a concentrated quantity at one point until the accumulation has become great enough to fall. I have encountered difficulty from this cause with the use of spouts having a bore of uniform or tapering diameter. The adherent liquid would gather on the rim of the spout and drip after the measured charge had passed out. Frequently the drip would fall on the top of the can outside of its nozzle and need to be wiped off. Excepting the rare instances where the drip fell into the nozzle of a can newly placed beneath the spout, the dripping liquid would be wasted. The means which I have here devised for preventing this dripping and wastage consists in giving the bore of the spout a flaring formation from a point near, but within, the outlet orifice to the terminal rim of the spout. The delivery end flare is indicated in Fig. 3 and is more clearly shown in Fig. 9 and designated by the reference character 43. The bore above the flaring portion may be cylindrical, or tapered with downward convergence of its walls. A distinct oblique angle 44 is formed between the upper portion of the bore and the flaring outlet extremity thereof. The cone angle of the flare is less than 90°, and preferably less also than 45°. It may be as small as 30°. By virtue thereof the creeping of the adherent film is arrested at the junction 44 and dripping is prevented. Hence the angle 44 is in the range between about 135° and about 165°. The capacity of any bucket varies to some degree with the viscosity of the liquid. That is, while a thin and highly fluid liquid will overflow the rear wall as soon as it rises to the upper edge thereof, a more viscous liquid will build up to a height above the wall edge, depending on its viscosity, before its surface breaks and allows it to spill over. With some liquids, differences of temperature make enough difference of viscosity to cause a substantial error in the measurements unless the temperature of the liquid entering the apparatus is held always at substantially the same degree.

My invention provides a means by which corrections may be made for any such differences of viscosity. Such means is here embodied in the adjustable stop 21 which may be set to arrest the crank arm 18 when the bucket is either squarely upright or tilted more or less either forward or backward from the vertical position. If tilted backward, its holding capacity is less, and if tilted forward is greater, than when truly vertical.

A compensating adjustment for the supply pipe 33 and nozzles 34 is provided so that the cut off of the entering stream will be effected equally quickly when the bucket is shifted from receiving position and whether or not it was tilted either way when receiving. To that end the supply pipe 33 is so mounted that it can be turned about its axis and the nozzles 34 thereby shifted so that they will deliver streams in substantially, or exactly, the same relation to the upper edges of the rear walls of the buckets, whatever may be the adjusted receiving position of the latter. The pipe passes through the end walls 15 and 16 of the box or case and is threaded at and adjacent to its opposite ends to receive lock nuts 45 on the outside and 46 on the inside of each end wall. The lock nuts may be loosened to permit rotary movement of the pipe, and tightened to hold it in any adjustment. The outlet ends of the nozzles are cut off on a bevel, substantially as shown, so that their orifices may be located close to the upper edges of the end walls of the buckets without interference when the buckets are tilted.

With the use of a supply pipe, such as that shown at 33, closed at one end and connected to a source of liquid through the other end, it is possible to supply the liquid through the nozzles 34 under a head sufficient to cause rapid enough discharge from the nozzles most remote from the entering end of the pipe. In measuring out quantities from four ounces to one quart, the pressure head may range from about two and a half to six feet in more or less nearly direct proportion to the volumes concerned. But for measuring smaller quantities than these such, for example, as two ounce charges or thereabout, a lower head is desirable, in the order of a few inches of the liquid. To maintain equal pressures at all of a series of nozzles and to limit the head, in such circumstances, I provide in substitution for the pipe 33, an open trough or tank 47 which is hung by tubular nipples or pipe sections 48, (one of which is shown in Fig. 7), passing through the end walls of the box and of the tank 47 in leakage tight connection with the latter. One of these pipe sections is coupled with the main supply source, as is the pipe 33, while the other serves as an overflow outlet and is connected with a recipient. Nozzles 34a, which are like the nozzles 34, depend from the lowest part of the bottom of tank 47. The depth of the tank bottom below the outlet pipe section determines the effective head under which the liquid is delivered to the measuring cups, and this head is maintained constant for all the nozzles by making the capacities of the inlet and outlet pipe sections larger than the combined capacities of all the nozzles and by making the horizontal area of the tank 47 substantially larger than the combined areas of the nozzle passageways.

This tank and its nozzles are likewise angularly adjustable as and for the same purpose as pipe 33, wherefore the pipe sections are clamped to the end walls 15 and 16 by releasable lock nuts 45 and 46. Additional means for securing these angular adjustments is provided in a stud 49 projecting from an end wall of tank 47 near its bottom through an arcuate slot in the end wall 16 of the container box, and having a clamp nut 50 on its threaded outer end. The inner end of the stud is coupled to the tank by means of a bracket 51 welded to the tank wall. This auxiliary clamp may be provided at either end of the tank, or both ends may be equipped with such clamps.

In use the liquid is constantly supplied to the supply pipe 33 or the equivalent open tank 47 and flows constantly from the nozzles. When the buckets are in their filling position, the issuing streams, or large portions of such streams, flow into them. So much of the liquid as passes outside of the rear walls of the buckets, that which overflows when the buckets are filled to capacity, and all that flows out from the nozzles when the buckets are being dumped and before they return to filling position, flows by means of the eduction pipe 36 to a tank from which it is taken for recirculation to the pipe 33 or tank 47. The overflow from the latter tank may pass to the same recipient.

When the rock shaft is turned to dump the buckets, the initial movement of the rear walls of the latter cuts off the entering streams before the angular movement has been enough to enlarge the holding capaciy of the buckets appreciably. Thereafter the contents of the buckets are carried and poured into the funnels, without slopping or spilling, and delivered through the spouts 42 to cans supported underneath the spouts.

A pet cock 52 is mounted in the bottom of the outer case to drain off any liquid which may seep into the space bounded by the plates 35 and 37.

What I claim and desire to secure by Letters Patent is:

1. An apparatus for measuring and delivering charges of liquid, comprising the combination of a tiltable bucket, means for swinging said bucket between substantially upright and dumping positions, and liquid supplying means including a nozzle having a downwardly directed outlet orifice disposed above and near the upper edge of that wall of the bucket which when the bucket is upright, is at the rear with respect to the direction in which the bucket is moved for dumping its contents.

2. An apparatus for measuring and delivering charges of liquid, comprising the combination of a tiltable bucket, means for swinging said bucket between substantially upright and dumping positions, liquid supplying means having a nozzle with a downwardly directed orifice disposed above and near the upper edge of that wall of the bucket which, when the bucket is upright, is at the rear with respect to the direction in which the bucket is moved for dumping its contents, and provisions for catching the liquid which passes from said supply means externally of the bucket.

3. An apparatus for delivering measured charges of liquid comprising a rotatable bucket support mounted to turn about a horizontal axis, a bucket on said support having a relatively high front wall, a relatively low rear wall and intermediate side walls of progressively diminishing height from the front wall to the rear wall, the bucket support being rotatable between a position in which the bucket is upright to one in which the bucket is inclined with its front wall extending on a downward slant from its junction with the bucket bottom, and the rear wall being offset laterally from the axis of the support so that its rear wall is raised at the commencement of the movement from the upright position to the second named position, a liquid supply conductor having a discharge nozzle located with a downwardly directed outlet orifice directly above the upper edge of the rear wall of the bucket so that the stream issuing therefrom flows substantially vertically downward into the bucket in close proximity to said rear wall and the initial movement of said rear wall in the tilting movement cuts off the stream, and a funnel arranged to receive the contents of the bucket when the latter is brought to the second named position.

4. An apparatus for delivering accurately measured quantities of liquid, comprising a liquid container to which liquid is constantly supplied and from the bottom of which a spout extends downwardly having an orifice at its lower end, a bucket support pivotally mounted to turn about a horizontal axis below and forwardly of said nozzle orifice, a bucket mounted on said support being tiltable by rotation of the support between a substantially upright position and a dumping position in which its forward wall is lower than its bottom, said bucket having a rear wall disposed with its upper edge directly beneath and close to the nozzle orifice so that at least a part of the stream issuing from the orifice enters the bucket when upright and the first movement of the bucket from the upright toward the tilting position cuts off the stream, and means for so turning the bucket support.

5. An apparatus for delivering accurately measured quantities of liquid, comprising a liquid container to which liquid is constantly supplied and from the bottom of which a spout extends downwardly having an orifice at its lower end, a bucket support pivotally mounted to turn about a horizontal axis below and forwardly of said nozzle orifice, a bucket mounted on said support being tiltable by rotation of the support between a substantially upright position and a dumping position in which its forward wall is lower than its bottom, said bucket having a rear wall disposed with its upper edge directly beneath and close to the nozzle orifice so that at least a part of the stream issuing from the orifice enters the bucket when upright and the first movement of the bucket from the upright toward the tilting position cuts off the stream, the other walls of the bucket being higher than said rear wall, and stop means for arresting the bucket support and bucket in the upright position, said stop means being adjustable to locate the bucket when substantially upright in different positions wherein the upper edge of the rear wall is higher or lower relatively to the upper edge of the front wall, whereby the holding capacity of the bucket is made greater or less, and the liquid container being adjustable to place the orifice of its nozzle in substantially the same relationship to the edge of the bucket rear wall in all adjusted positions of the bucket.

6. A device for delivering accurately measured volumes of liquid comprising a box or case, a rock shaft mounted rotatably in said case to turn about a horizontal axis, a liquid container coupled to receive liquid from a supply source, mounted in said case at a higher level than said rock shaft and having a downwardly directed discharge nozzle with an outlet orifice at its lower end and being angularly adjustable about an axis parallel to the rock shaft so that its orifice may be shifted forwardly and rearwardly, a bucket secured to said rock shaft and being movable by rotation of the rock shaft between a substantially upright position and a dumping position, the wall of the bucket which is at the rear with respect to the direction in which the bucket moves from its upright toward its dumping position being lower at its upper edge than any other part of the bucket rim and being suitably located to be brought directly under the nozzle orifice when the bucket is substantially upright.

7. A device for delivering accurately measured volumes of liquid comprising a box or case, a rock shaft mounted rotatably in said case to turn about a horizontal axis, a liquid container coupled to receive liquid from a supply source, mounted in said case at a higher level than said rock shaft and having a downwardly directed discharge nozzle with an outlet orifice at its lower end and being angularly adjustable about an axis parallel to the rock shaft so that its orifice may be shifted forwardly and rearwardly, a bucket secured to said rock shaft and being movable by rotation of the rock shaft between a substantially upright position and a dumping position, the wall of the bucket which is at the rear with respect to the direction in which the bucket moves from its upright toward its dumping position being lower at its upper edge than any other part of the bucket rim and being suitably located to be brought directly under the nozzle orifice when the bucket is substantially upright, an external operating member connected to said rock shaft for transmitting torque thereto, and stop means on the case for arresting said member when the bucket is in either of its before named positions, the stop means which governs the arrest in the upright position being adjustable so as to vary that position conformably to adjustments in the position of the nozzle orifice.

8. An apparatus for delivering measured quantities of liquid comprising a box or case, a rock shaft supported in said case for rotation about a horizontal axis, a liquid container in the form of an open tank at a higher level than that of said shaft having a nozzle extending downward from its bottom and having connections for reception of the liquid, a bucket secured to the rock shaft having front, rear and side walls extending upwardly from the rock shaft when the latter is in one position of rotation, the upper edge of said rear wall being lower than any other part of the bucket rim and directly beneath and close to the orifice of said nozzle when the shaft is in said position, the rock shaft being rotatable away from the before named position to a dumping position in which the front wall of the bucket is downwardly inclined from its junction with the bottom wall, and walls in the case forming a funnel space located to receive the liquid contents of the bucket when in the latter position.

9. An apparatus for delivering measured quantities of liquid comprising a box or case, a rock shaft supported in said case for rotation about a horizontal axis, a liquid container in the form of an open tank located at a higher level than that of said shaft having a nozzle extending downward from its bottom and having connections for reception and overflow of the liquid, a bucket secured to the rock shaft having front, rear and side walls extending upwardly from the rock shaft when the latter is in one position, the upper edge of said rear wall being lower than any other part of the bucket rim and directly beneath and close to the nozzle orifice when the shaft is in said position, the rock shaft being rotatable away from the before named position to a dumping position in which the front wall of the bucket is downwardly inclined from its junction with the bottom wall, walls in the case forming a funnel space located to receive the liquid contents of the bucket when in the latter position, and a spout leading downward from the funnel space and including a tube of which the orifice is at the lower end and the bore has an outward flare from a zone above and near the orifice.

10. A device for accurately measuring prescribed volumes of liquid and delivering the same, comprising a box or case having adjacent to its front wall a series of funnels with downwardly directed outlet spouts at their lower ends, a rock shaft mounted in said box to turn about a horizontal axis in rear of the funnels and above their rearmost walls, a row of buckets mounted on the rock shaft in position to be shifted by rotation of the rock shaft from a substantially upright position to a downwardly inclined dumping position with the mouth portion of each bucket directed into one only of the funnels, and a liquid supply container mounted in the box to extend across the same above and to the rear of the rock shaft with its ends supported in the end walls of the box, having a connection at one end for reception of liquid from an external source, and also having a plurality of nozzles spaced conformably to the several buckets so that each nozzle is adapted to deliver liquid into one bucket, different from all of those into which the other nozzles deliver, when the buckets are upright.

11. A liquid measuring device as set forth in claim 10, in which the liquid container is an open tank having nipples at its ends supported in the end walls of the box on a line substantially parallel to the rock shaft, one of which nipples serves as an admission conductor to the tank and the other as an overflow conductor.

12. A liquid measuring and delivering apparatus comprising a case having in its lower part floor plates which adjoin one another in a ridge intermediate the front and rear walls of the case and extend downwardly to front and rear respectively, the space between one of said floor plates and the front wall constituting a funnel and that between the other floor plate and the rear wall constituting a receiving space for liquid overflow, a rock shaft mounted in the case above and to the rear of the ridge formed by the junction of said floor plates, a liquid supply container mounted in the case in rear of said ridge at a higher level than the rock shaft and having a downwardly directed discharge nozzle, a bucket supported by the rock shaft in a position such that it extends upwardly from the rock shaft when the latter is in one position and extends therefrom on a downward slant into the funnel space when the rock shaft is turned to another position, the rear portion of the bucket being below and close to the nozzle orifice when the bucket is in the first named position.

13. A liquid measuring device as set forth in claim 12, having a downwardly directed delivery spout from the bottom of the funnel space and an outlet from the lower part of the overflow space.

14. A liquid measuring device as set forth in claim 12, in which the floor plate at the bottom of the funnel space has a forwardly curled lip at its upper edge for arresting liquid which may surge back when dumped from the bucket.

15. In a measuring and delivering apparatus, a measuring bucket having a relatively high front wall, a relatively low rear wall and intermediate side walls of which the upper edges are of diminishing height from their junctions with the front wall toward the rear wall, and the rear wall being formed in part by an adjustable gate which is movable up and down to occlude more or less of the height of the space between the side walls.

CHARLES F. EATON.

REFERENCES CITED

The following references are of record in the file of this patent:

UNITED STATES PATENTS

| Number | Name | Date |
| --- | --- | --- |
| 2,019,955 | Eastman | Nov. 9, 1935 |
| 1,638,189 | DuPont | Aug. 9, 1927 |
| 720,918 | Hesketh | Feb. 17, 1903 |
| 1,876,554 | Bemis | Sept. 13, 1932 |
| 604,321 | Haye | May 17, 1898 |
| 2,157,282 | De Javannes | May 9, 1939 |
| 1,250,598 | Langstaff | Dec. 18, 1917 |
| 2,180,702 | Berwick | Nov. 21, 1939 |